UNITED STATES PATENT OFFICE.

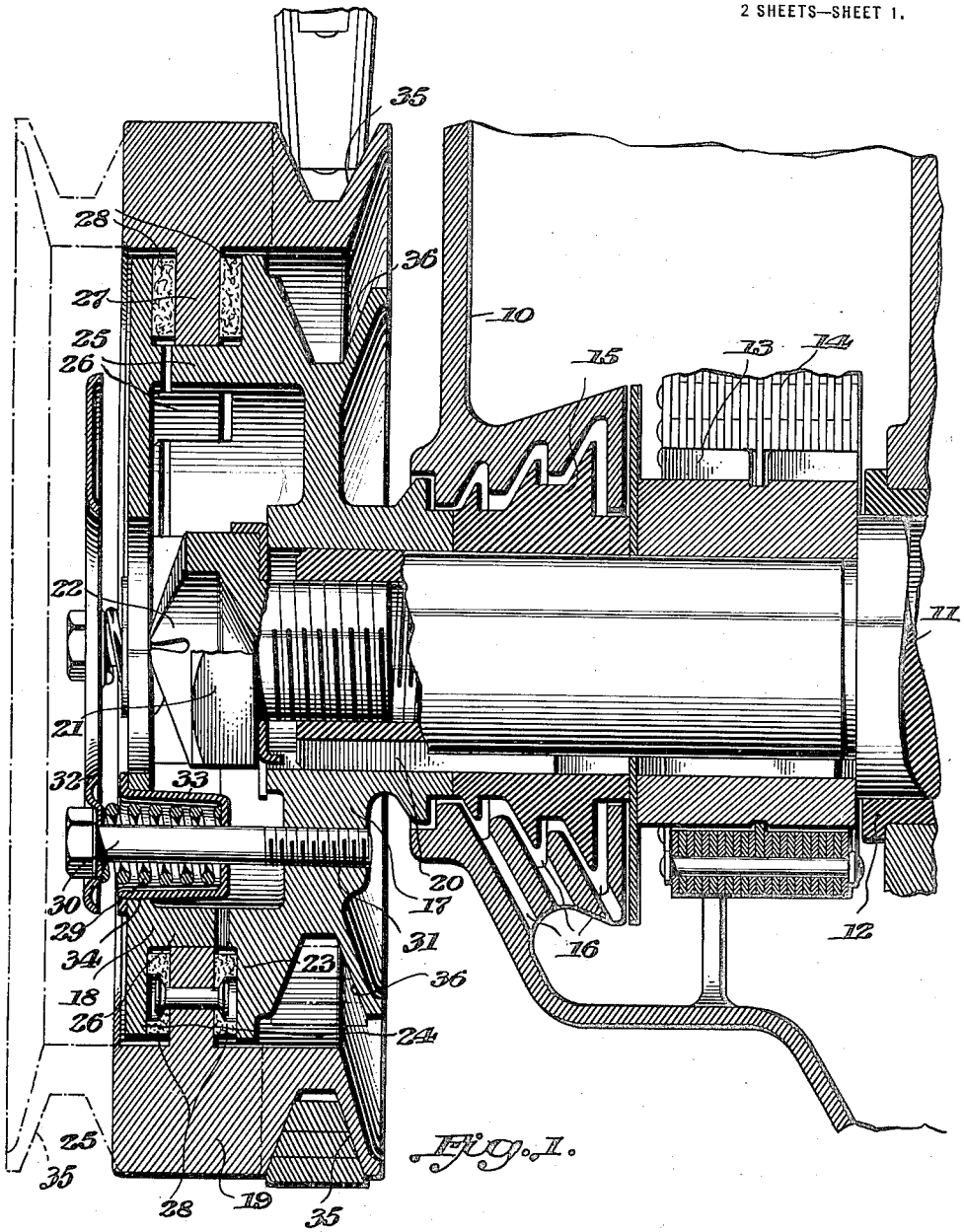

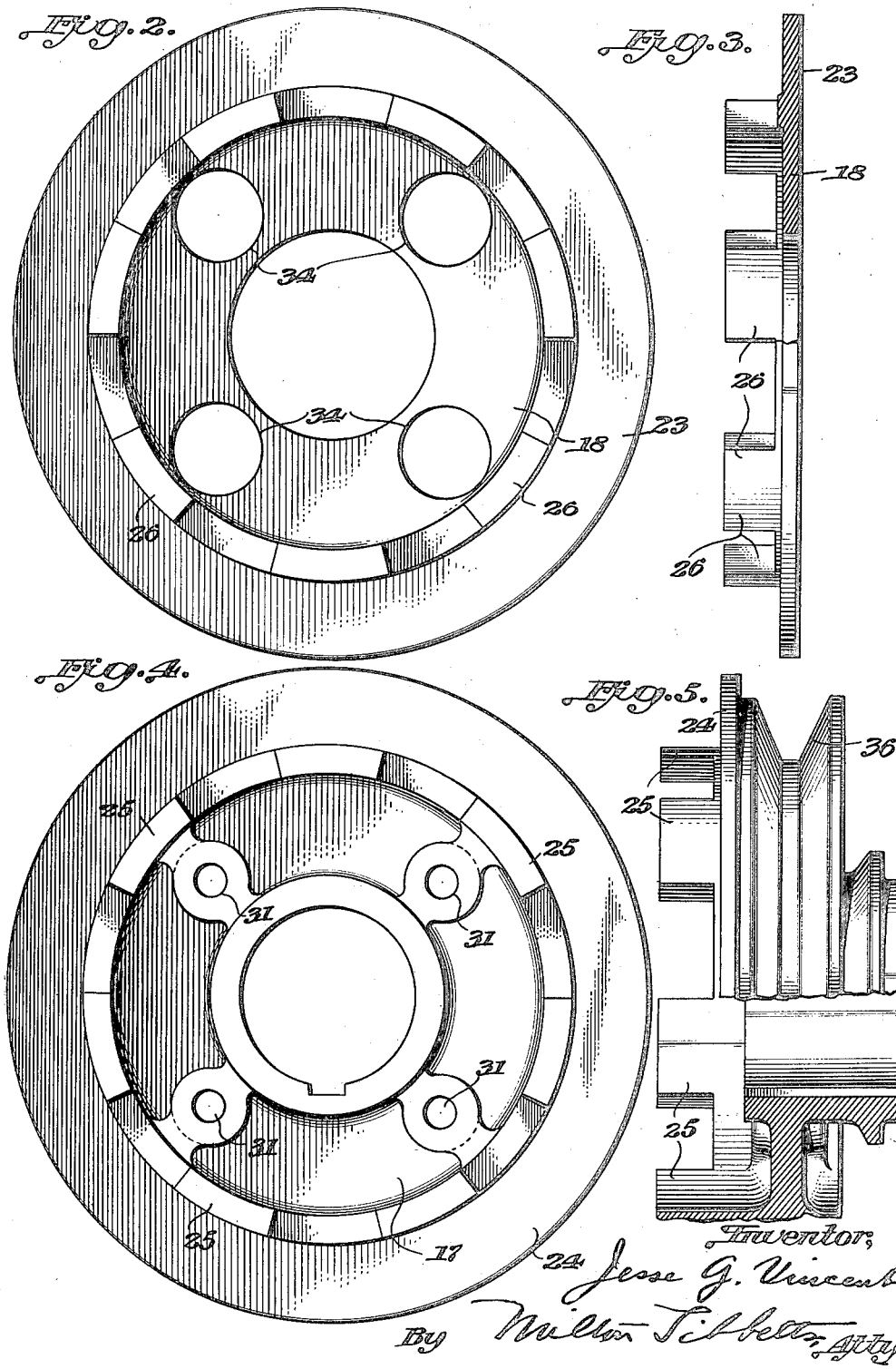

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

VIBRATION DAMPER FOR HYDROCARBON MOTORS.

1,422,324.            Specification of Letters Patent.    Patented July 11, 1922.

Application filed January 17, 1919. Serial No. 271,591.

*To all whom it may concern:*

Be it known that I, JESSE G. VINCENT, a citizen of the United States, and resident of Detroit, Wayne County, State of Michigan, have invented certain new and useful Improvements in Vibration Dampers for Hydrocarbon Motors, of which the following is a specification.

This invention relates to hydrocarbon motors and particularly to vibration damping means therefor.

Specificaally, the invention relates to the construction and arrangement of a vibration damper for use on one end of a crank shaft for the purpose of damping out the torsional vibrations of the shaft. It consists of a relatively small fly wheel yieldingly or frictionally mounted so that as the shaft vibrates torsionally the fly wheel will meet the vibrations and tend to eliminate them.

When a vibration damper of the above type is used on the motor of a motor vehicle the fan, which is usually arranged in the rear of the vehicle radiator, is frequently driven by a belt operated either from the fly wheel part of the vibration damper or from the inner member of the damper, depending upon various circumstances, such as the size of the damper fly wheel or the speed at which it is desired to drive the fan. If the damper fly wheel is of such size that if belted to the fan it will drive the latter at the desired speed, a groove may be formed in the fly wheel to take the fan belt, but if the damper fly wheel is larger than would be required to give the fan the desired speed, a separate grooved pulley is formed on some other part of the damper, such as its inner member, or of course the pulley may be formed as a separate piece and otherwise driven by the crank shaft.

One of the objects of the present invention is to provide a vibration damper in which there are two belt grooves and one of the parts of the damper is made reversible so that either of said belt grooves may be used with the fan driving belt of a motor vehicle.

Another object of the invention is to simplify the construction of a vibration damper so that it may be made more easily and function better.

Another object of the invention is to provide a vibration damper so that the fan of a motor vehicle may be driven from it either by the fly wheel part or by the member which is rigidly secured to the crank shaft.

Other objects of the invention will appear from the following description taken in connection with the drawings, which form a part of this specification, and in which:—

Figure 1 is a vertical section through one end of a hydrocarbon motor and the vibration damper mounted on the crank shaft thereof;

Figure 2 is a plan view of one of the inner members of the vibration damper shown in Figure 1;

Figure 3 is an edge view and part section of the member shown in Figure 2;

Figure 4 is a face view of the other inner member of the vibration damper shown in Figure 1; and Figure 5 is an end elevation and part sectional view of the member shown in Figure 4.

Referring to the drawings, 10 represents the forward part of a motor crank case and 11 is the motor crank shaft mounted in a bearing 12 therein. A sprocket or gear 13 keyed to the crank shaft 11 drives a chain 14 which operates the cam shaft or other parts of the motor. A throw-off ring 15 is also secured to the crank shaft and oil grooves 16 are adapted to carry the oil thrown off by the ring 15 back into the crank case to prevent its escape from the latter.

Mounted upon the end of the crank shaft which projects from the crank case is the vibration damper illustrative of the present invention. This damper consists of three principal members, two inner members 17 and 18 respectively, and an outer or fly wheel member 19. The member 17 is keyed to the crank shaft as by a key 20 and a nut 21 is threaded into the end of the crank shaft to retain this member in place. As shown, the nut 21 has teeth or jaws 22 for the starting crank of the motor. The members 17 and 18 are provided with opposing plate portions 23 and 24 respectively and just inside of these plate portions these members are formed with interlocking parts 25 and 26. These parts are very well shown in Figures 2 to 5, inclusive, and it will be understood that they are so made that the members will interlock and yet they may be moved axially relatively to each other. The interlocking parts 25 of the member 17 are circumferentially slightly larger than the parts 26 of the member 18, and the fly wheel member 19 is provided with an inwardly extending part 27 which is arranged between the plate portions 23 and 24 and is centered upon the circumference of the parts 25 of the member 17. Thus the fly wheel member 19 is entirely out of contact with the parts 26 of the member 18 and is centered solely upon the parts 25 of the member 17. This insures a correct alignment of the fly wheel because of the arrangement of the member 17 directly upon the crank shaft.

The opposite faces of the part 27 of the fly wheel are preferably lined with friction disks 28 to thus increase the frictional resistance between the fly wheel and the inner members of the damper.

The two inner members 17 and 18 are spring pressed together by means of a series of coil springs 29 one of which is shown in section in Figure 1, each of said springs surrounding a bolt 30 which is threaded into the inner member 17 as at 31. Each of these springs 29 acts against a plate 32 and a socket piece 33, the latter being arranged in an opening 34 formed in the member 18.

It will be understood that the spring tension may be adjusted by screwing the bolts 30 into or out of the member 17. It will be understood further that the member 18 is caused to rotate with the member 17 due to their interlocking engagement and the bolts 30 are not therefore required to carry any torsional strain whatever.

It will be noted that the inwardly extending part 27 of the fly wheel member 19 is arranged at one side of the middle of the fly wheel and a pulley groove 35 is formed in the periphery of the fly wheel and wholly at one side of the part 27. The fly wheel member 19 therefore is reversible and it may be arranged to co-operate with the inner members in the position in which it is shown in full lines in Figure 1 or it may be removed and reversed so that it is in the position shown in dotted lines in Figure 1. In both positions the function of the fly wheel as a vibration damper is the same.

It will be noted also that the inner member 17 which is rigidly secured to the crank shaft is provided with a pulley groove 36 which is arranged as shown in direct alignment with the pulley groove 35 when in the position shown in full lines in Figure 1. The pulley groove 36 is of course smaller in diameter than the pulley groove 35 since it is arranged radially inside of the latter, and it will be obvious therefore that if the inner pulley groove is used as a driving member for a belt the speed of the driven member will be less than it would if driven by a belt in the larger pulley groove 35. The pulley groove 36 therefore is used when a relatively low speed for the motor vehicle fan is desired and the pulley groove 35 is used when a higher speed is necessary. To use the groove 36 the fly wheel member 19 is reversed or placed in the position shown in dotted lines in Figure 1. It is of course possible to use both pulley grooves 35 and 36 to drive separate fans or other devices, when the fly wheel member 19 is in the position shown in dotted lines.

It will be understood that the invention is not limited to the exact form in which it is shown in these drawings and various modifications may be made without departing from the spirit or scope of the invention.

Having thus described my invention, what I claim and desire to secure by Letters Patent is:—

1. In combination, a shaft, an inner member having a pulley groove therein, an outer member having a pulley groove on its outer surface and a flange portion extending inwardly from its inner surface and adapted to engage said inner member, and means for securing said members together.

2. In combination, a shaft, an inner member having a pulley groove therein, an outer member having a pulley groove on its outer surface and having an inwardly projecting portion offset laterally with respect to the groove on its outer surface, and means for connecting said members together.

3. The combination with a shaft, of a vibration damper thereon comprising inner and outer members each having pulley grooves therein.

4. A vibration damper comprising an inner member having a pulley groove therein, an outer member having a pulley groove therein, and means for frictionally connecting said members in either of two positions.

5. A vibration damper comprising an inner member having a pulley groove therein, an outer member having a pulley groove therein, and means for frictionally connecting said members, said outer member being reversible so that its pulley groove may be arranged either in line or out of line with the groove in the inner member.

6. The combination with a shaft, of a vibration damper thereon comprising a member secured to the shaft and having a pulley part and interlocking parts, a second member having parts interlocking with those of the first member, the interlocking parts of the second member being slightly smaller in diameter than those of the first member, and a fly wheel member centered upon the interlocking parts of the first member and frictionally engaging the first and second members.

7. The combination with a shaft, of a vibration damper thereon comprising inner and outer members each having pulley grooves therein, said members being relatively adjustable so that the pulley grooves may be arranged either in line or out of line as desired.

8. The combination with a shaft, of a vibration damper thereon comprising inner and outer members each having pulley grooves therein, said members being relatively adjustable so that the pulley grooves may be arranged in line or out of line and when out of line no part of the outer member is in line with groove of the inner member.

9. A vibration damper comprising interlocking members, the interlocking parts of one of said members being slightly smaller in diameter than those of the other member, and a fly wheel member centered upon the larger interlocking parts and frictionally engaging both of said interlocking members.

In testimony whereof I affix my signature.

JESSE G. VINCENT.